United States Patent [19]

Bentley et al.

[11] Patent Number: 4,807,588
[45] Date of Patent: Feb. 28, 1989

[54] WATER PERMEABLE HEAT EXCHANGER FOR CONDENSING FURNACE

[75] Inventors: Richard M. Bentley, Camillus; Chester D. Ripka, East Syracuse; Henry F. Keller, Syracuse, all of N.Y.

[73] Assignee: Carrier Corporation, Syracuse, N.Y.

[21] Appl. No.: 116,994

[22] Filed: Nov. 5, 1987

Related U.S. Application Data

[62] Division of Ser. No. 881,430, Jul. 2, 1986, abandoned.

[51] Int. Cl.⁴ .............................................. F24H 3/02
[52] U.S. Cl. ................................. 126/110 R; 165/133
[58] Field of Search ............... 165/133, 134, 909, 921, 165/913; 427/292, 230, 239; 126/110 R

[56] References Cited

U.S. PATENT DOCUMENTS

| | | | |
|---|---|---|---|
| 2,724,672 | 11/1955 | Rubin | 427/239 |
| 2,838,287 | 6/1958 | Kuhner | 165/921 X |
| 4,403,572 | 9/1983 | Gerstmann et al. | 165/921 X |
| 4,557,202 | 12/1985 | Warner | 165/909 X |
| 4,621,686 | 11/1986 | Ahn | 165/921 X |
| 4,651,923 | 3/1987 | Ben-Shmuel et al. | 165/909 X |

Primary Examiner—Larry Jones
Attorney, Agent, or Firm—Robert H. Kelly

[57] ABSTRACT

A gas-fired condensing furnace with a corrosion resistant condensing heat exchanger. The condensing heat exchanger is formed from a perforated flat sheet of engineering metal with a layer of polymer sheet material laminated thereto. Each condensing heat exchanger has a condensing flow passage of serpentine shape formed in the laminated flat perforated sheet of engineering metal such that the polymer layer is permeated by water condensed from the flue gases, and the permeated water flows through the perforated sheet metal and is not allowed to accumulate at the interface between the engineering metal and the polymer sheet.

3 Claims, 2 Drawing Sheets

FIG. I

WATER PERMEABLE HEAT EXCHANGER FOR CONDENSING FURNACE

This application is a divisional application of Ser. No. 06/881,430, filed 7/2/86, now abandoned.

BACKGROUND OF THE INVENTION

This invention relates generally to gas-fired condensing furnaces. More specifically, the present invention relates to a corrosion resistant condensing heat exchanger for use in the corrosive environment of a gas-fired condensing furnace and to the method of manufacture thereof.

Due to the cost and shortage of natural gs, attempts have been made to design and construct more efficient gas-fired hot air furnaces. One method for maximizing the heat energy transferred from a heating fluid, i.e. combustion gas, to air to be heated, i.e. the air in the enclosure or space to be heated, is to transer as much latent heat as possible from the water vapor in the heating fluid to the air to be heated. Thus, increases in furnace heating efficiency have been accomplished by cooling the heating fluid, while still within the furnace, to below the dew point to recover some of the latent heat of vaporization as usable energy. This is generally accomplished by adding a condensing heat exchanger to the primary heat exchanger, and passing air to be heated initially over the condensing heat exchanger, and then over the primary heat exchanger. Depending on the type of condensing furnace, efficiencies can be in the low-to-mid 90% range.

Some furnace heat exchangers have been constructed from two engineering metal sheets such that a fluid flow path is created when the two sheets are stamped and assembled. This type of heat exchanger is known as a clamshell heat exchanger. The corrosive environment of a condensing heat exchanger, which may have a variety of acids, including $H_2SO_4$ or HCL, necessitates different material requirements that those typical of the primary heat exchanger. Concentrations of as little as 10 ppm (parts per million) of $H_2SO_4$ or HCL may severely corrode bare steel and pit aluminum and copper. Accordingly, a condensing heat exchanger must be constructed of material having good heat transfer, adequate strength, minimum material thickness, resistance to chemical attack, and low manufacturing costs. Due to the material requirements for the corrosive environment of a condensing heat exchanger, these heat exchangers are generally manufactured from 300 Series stainless steel which is more costly than carbon steels or other engineering metals previously associated with furnace heat exchanger construction. Organic coatings on carbon steels, which are applied from a liquid or powder state, perform very poorly when used in condensing heat exchangers. Such coatings inherently contain voids thereby causing localized corrosion of the steel substrate. Sheet coatings of polymeric material laminated on solid sheets of metals are free of voids and withstand the fabricating process, but after furnace operation blisters are formed on the laminating surface. The blisters are formed by the coalescence of water molecules that permeate through the polymer film and become trapped at the film-steel substrate interface. These blisters could impede the passage of flue gas and increase the pressure drop across the heat exchanger, thus causing the furnace to operate improperly.

SUMMARY OF THE INVENTION

It is an object of the present invention to provide a relatively inexpensive and corrosion resistant condensing heat exchanger for a condensing furnace.

Another object of the present invention is to provide a method of manufacturing a corrosion resistant condensing heat exchanger having a layer of corrosion resistant polymer sheet material over a perforated substrate internal surface.

A further object of the present invention is to provide a more reliable condensing furnace.

A still further object of the present invention is to provide a porous or perforated metal substrate with a polymer film sheet laminated thereto, which will not suffer blister damage during condensing heat exchanger operation.

These and other objects of the present invention are attained by a laminated steel heat exchanger and a method of manufacture thereof for a condensing furnace comprising a burner device for supplying a heating fluid, a primary heat exchanger disposed generally below the burner device, the condensing heat exchanger, and an induced draft device generally disposed below the condensing heat exchanger for drawing the heating fluid downwardly through the primary heat exchanger and the condensing heat exchanger and exhausting the flue gases out a vent. Moreover, a room air to be heated is circulated upwardly in a counterflow direction relative to the downwardly flowing heating fluid by a blower device that is located generally below the condensing heat exchanger. A downward flow of room air may also be embodied in which case the relative positions of the heat exchangers ae reversed.

The various features of novelty which characterize the invention are pointed out with particularlity in the claims annexed to and forming a part of this specification. For a better understanding of the invention, its operating advantages and further specific objects attained by its use, reference should be made to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
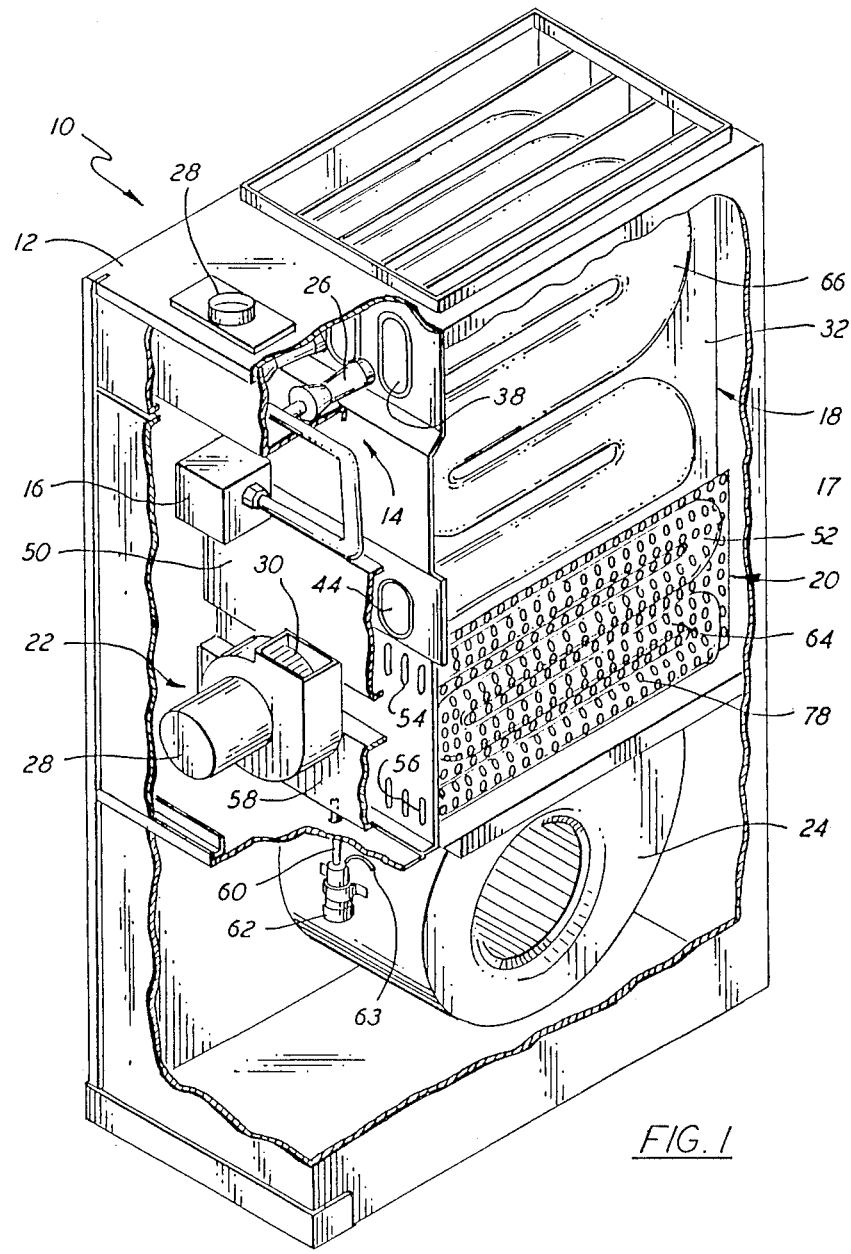
FIG. 1 is a perspective view, partly broken away, of a gas-fired condensing furnace.

FIG. 1 illustrates a condensing furnace 10 including cabinet 12 housing therein burner assembly 14, gas control assembly 16, primary heat exchanger assembly 18, condensing heat exchanger assembly 20, induced draft motor assembly 22, and circulating air blower 24. Important to the present invention is the vertical arrangement of the above major assemblies, and particularly the condensing heat exchanger assembly 20 relative to primary heat exchanger assembly 18 and circulating air blower 24 in order to produce condensation in the condensing heat exchanger assembly 20.

Burner assembly 14 includes a plurality of inshot burners 26, one for each respective primary heat exchanger cell 32. Burners 26 receive fuel gas from gas control assembly 16 and inject the fuel gas into respective primary heat exchanger inlets 38. A part of the injection process includes drawing air through combustion air inlet 28 into primary heat exchanger assembly 18 so that the fuel gas and air mixture may be combusted therein. It should be unerstood that the number of primary heat exchanger cells and corresponding burners is established by the required heating capacity of the furnace.

Each primary heat exchanger cell 32 has a serpentine flow path which connects the primary heat exchanger inlets 38 in fluid communication to respective primary heat exchanger outlets 44. As the combustion gas exits the primary heat exchanger outlet 44 it flows into coupling box 50. Also connected to coupling box 50 and in fluid communication therewith is condensing heat exchanger assembly 20 including a plurality of generally identical condensing heat exchanger cells 52. Each condensing heat exchanger cell 52 includes a respective condensing heat exchanger inlet 54 opening into coupling box 50 and a condensing heat exchanger outlet 56 opening into condensate collector 58 through apertures in cell mounting panel 100. Condenser heat exchanger outlets 56 deliver heating fluid exhaust or flue gases and condensate to condensate collector 58. As can be seen, most clearly in FIGS. 1 and 2, each condensing heat exchanger cell has an internal fluid flow path which winds downwardly from coupling box 50 in a serpentine manner. Further, there are more condensing heat exchanger cells 52 than primary heat exchanger cell 32. In this embodiment there are four condensing heat exchanger cells for each primary heat exchanger core.

Induced draft motor assembly 22 includes a motor 28 with an inducer wheel 30 for drawing the combustion fluid created by burner assembly 14 through primary heat exchanger assembly 18, coupling box 50, and condensing heat exchanger assembly 10, and thereafter exhausting the flue gases to a flue duct (not shown).

Circulating air blower 24 delivers return air, from the enclosure or space to be heated, upwardly in a counterflow direction relative to the downward flow of the combustion fluid through condensing heat exchanger assembly 20 and primary heat exchanger 18, whereby the cooler return air passing over condensing heat exchanger assembly 20 lowers the temperature of the flue gas or combustion fluid from about 350° F. at the inlet to about 100° F. at the outlet. Although the flue gas enters the condensing heat exchanger at about 350° F. the temperature of the wall of the heat exchanger remains below 250° F., thus never reaching the continuous use temperature of selected polymer sheet. The reduction in temperature of the flue gas causes the gas to drop below the dew point causing a portion of the water vapor therein to condense, thereby recovering a portion of sensible and latent heat energy. The condensate formed within each individual condensing heat exchanger cell 52 flows out outlet 56 through condensate collector 58 and into condensate drain tube 60 to condensate drain trap 62 and out drain 63. As blower 24 continues to force air to be heated upwardly over the outside of condensing heat exchanger assembly 20 and primary heat exchanger 18, heat energy is transferred from the heating fluid flowing through the condensing flow passage 64 in condensing heat exchanger cell 52 and primary flow passage 66 in each primary heat exchanger cell 32 to the return air.

Figure 3:
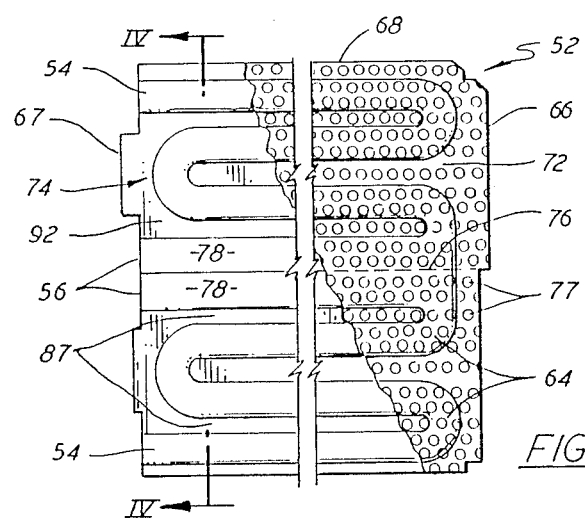
FIG. 3 is a top plan view, partly broken away, of a single flat condensing heat exchanger with a polymer sheet material on a perforated substrate having formed therein a flow passage pattern for the flow of combustion gases therein.
Figure 4:
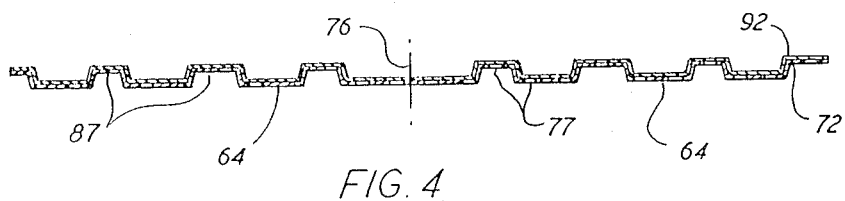
FIG. 4 is a schematic representation of the cross-section of the condensing heat exchanger of FIG. 3 taken along line IV—IV.

Referring now to FIGS. 3 and 4, a description of the condensing heat exchanger cell and method of manufacturing said cell 52 will be described. Generally, a single condensing heat exchanger cell 52 is manufactured from a single flat porous or perforated sheet metal blank 72. The flat perforated sheet metal blank 72 is preferably made of carbon steel or other inexpensive engineering metal, such as aluminum, copper, or low alloy ferritic stainless steel and has a plurality of apertures 77 therethrough. The method of manufacturing a condensing heat exchanger cell 52 includes designing a flow passage pattern forming condensing flow passages 64 having high velocity characteristics appropriate to the desired heat transfer requirements. The present invention provides a nonfolded high velocity flow passage pattern 74, wherein the term nonfolded refers to an open-face pattern that must be folded together to produce the intended or desired product. Pattern 74 is of serpentine design which will ultimtely result in a four pass counterflow passage, such as condensing flow passage 64.

As illustrated in FIG. 3, nonfolded high velocity flow passage pattern 74 has been formed, such as by stamping, into single flat perforated sheet metal blank 72, thereby resulting in the formation lof condensing flow passage 64 having inlet 54 and outlet 56. As illustrated, fold line 76 is disposed generally along the longitudinal center line of the formed or stamped portion of outlet 56, so that upon folding perforated sheet metal blank 72 at fold line 76, condensing heat exchanger cell 52 is formed such that the last section 78 of flow passage 64 is seamless, as at 86 in FIG. 2, thereby preventing leakage of condensate from the heat exchanger cell 52.

Figure 2:
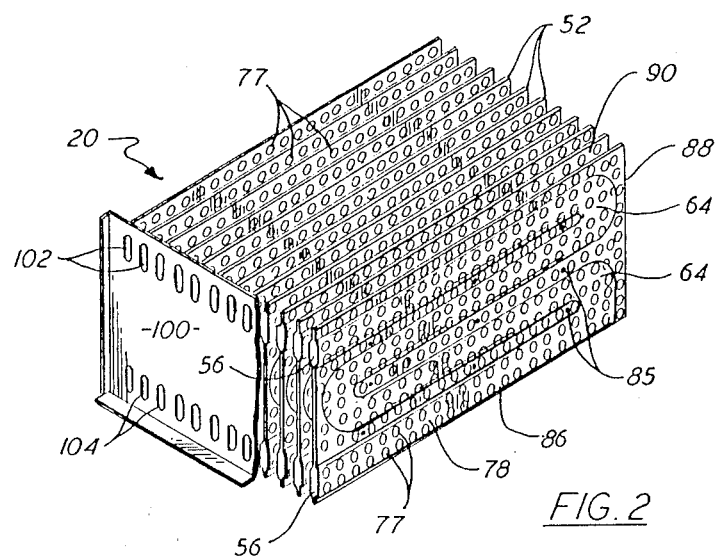
FIG. 2 is a perspective view, partly broken away, of the condensing heat exchanger assemblies illustrated in FIG. 1.

Prior to perforated sheet metal blank 72 being stamped and folded, a thin layer (i.e. 5 to 15 mils thick) of corrosion resistant materal, e.g. a polymer sheet stock 92, is adhesively bonded to the metal blank 72. The sheet metal blank is then stamped and folded along the fold line 76. After sheet metal blank 72 has been folded at fold line 76, condensing heat exchanger cell 52 as illustrated in FIG. 2, is formed.

FIG. 4 shows a cross-sectional view of perforated sheet metal blank 72 with the polymer sheet stock 92 adhesively bonded thereto prior to folding said metal blank 72. The polymer sheet stock 90 is generally 10 mils or less thick to provide good heat transfer therethrough. The perforated sheet metal blank 72 prevents the formation of blisters, which would be formed by the coalescence of water molecules that permeate a polymer sheet stock, and become trapped at the interface of a polymer film and solid sheet stock, by permitting the water molecules to flow through the apertures 77 to the surrounding environment.

Final processing or perperation of condensing heat exchanger cell 52 produced from sheet metal blank 72 includes folding and crimping tabs 66, 67, 68 over their corresponding opposite sides to form edge 88 and 90 along their length and edge 92 between inlet 54 and outlet 56, and applying rivets 85 or other fasteners to the land area 87.

Assembly of condensing heat exchanger assembly 20 comprises securing a plurality of condensing heat exchangers 52 to cell mounting panel 100. Cell mounting panel 100 has a like plurality of inlets 102 communicating with respective condensing heat exchanger inlets 54 and outlets 104 communicating with respect of heat exchanger outlets 56. Of course, inlets 102 communicate with coupling box 50, and outlets 104 communicate with condensate collector 58, as previously described.

The foregoing description is directed to a preferred embodiment of the present invention and various modifications and other embodiments thereof will become readily apparent to one of ordinary skill in the art to which the present invention pertains. Therefore, while the present invention has been described in conjunction with a particular embodiment it is to be understood that various modifications thereof may be made without departing from the scope of the invention as described and claimed herein.

What is claimed is:

1. A warm air furnace for raising the temperature of air being circulated in heat exchange relation through the furnace and for discharging the heated air to an enclosure to be heated comprising:

a cabinet defining a flow path for the air to be heated;

a blower arranged relative to said flow path of the air to be heated for moving the air to be heated through said cabinet;

a burner for supplying a heating fluid producing hot gaseous products of combustion having water vapor therein;

a primary heat exchanger arranged relative to said flow path of the air to be heated, said primary heat exchanger defining an internal flow path for conducting hot gaseous products of combustion and water vapor within said internal flow path to supply heat energy for raising the temperature of the air being circulated in heat exchange relation therewith, said primary heat exchanger including an inlet section for receipt of said heating fluid, a combustion connected to said inlet section wherein said heating fluid is combusted, and an outlet section connected to said combustion section such that the various sections form said internal flow path, said burner arranged adjacent said inlet section of said primary heat exchanger to direct said heating fluid to be combusted into said combustion portion of said primary heat exchanger;

a clam shell condensing heat exchanger fluidly connected to said outlet section of said primary heat exchanger having a generally serpentine condensing flow path leading downwardly from an inlet portion to an outlet portion at the bottom of said condensing heat exchanger, said condensing heat exchanger comprising an engineering metal element having a plurality of apertures therethrough, said element being laminated with a layer of water permeable corrosion resistant sheet material over a substantial portion of its entire internal surface whereby water permeates through said corrosion resistant sheet material and through said plurality of apertures in said engineering metal into said flow path of the air to be heated;

an induced draft blower fluidly connected to said outlet portion of said condensing heat exchanger for drawing said hot gaseous products of combustion through said internal flow path of said primary heat exchanger and said condensing flow path or discharge through a flue; and a condensate removal means arranged relative to said bottom of said condensing heat exchanger for withdrawing condensate from said condensing heat exchanger.

2. A warm air furnace a set forth in claim 1 wherein said layer of corrosion resistant sheet material has a thickness of generally 10 mils or less.

3. A warm air furnace as set forth in claim 1 wherein said layer of corrosion resistant sheet material is formed from a polymeric material.

* * * * *